United States Patent
Cooper et al.

(10) Patent No.: US 6,676,912 B1
(45) Date of Patent: Jan. 13, 2004

(54) METHOD FOR REMOVAL OF NITROGEN OXIDES FROM STATIONARY COMBUSTION SOURCES

(75) Inventors: Charles D. Cooper, Maitland, FL (US); Christian A. Clausen, III, Chuluota, FL (US); Michelle M. Collins, Washington, DC (US)

(73) Assignee: The United States of America as represented by the Administrator of the National Aeronautics & Space Administration, Washington, DC (US)

( * ) Notice: Subject to any disclaimer, the term of this patent is extended or adjusted under 35 U.S.C. 154(b) by 10 days.

(21) Appl. No.: 09/698,607

(22) Filed: Oct. 27, 2000

Related U.S. Application Data (60) Provisional application No. 60/163,045, filed on Oct. 28, 1999.

(51) Int. Cl.$^7$ ................................................ C01B 21/00
(52) U.S. Cl. ........................ 423/235; 423/393; 423/402
(58) Field of Search ................................ 423/235, 402, 423/393

(56) References Cited

U.S. PATENT DOCUMENTS

| | | | |
|---|---|---|---|
| 3,733,393 A | | 5/1973 | Couillaud et al. |
| 3,991,167 A | | 11/1976 | Depommier et al. |
| 4,182,278 A | | 1/1980 | Coakwell |
| 4,208,386 A | | 6/1980 | Arand et al. |
| 4,213,944 A | * | 7/1980 | Azuhata et al. ............. 423/235 |
| 4,426,364 A | | 1/1984 | Cooper et al. |
| 4,995,955 A | * | 2/1991 | Kim et al. ............... 204/157.2 |
| 5,120,508 A | | 6/1992 | Jones |
| 5,151,258 A | | 9/1992 | Gubanc et al. |
| 5,180,567 A | | 1/1993 | Yoshimoto et al. |
| 5,230,870 A | | 7/1993 | Johnson |
| 5,489,421 A | | 2/1996 | Velzen et al. |
| 5,520,895 A | | 5/1996 | Sharma et al. |
| 5,589,147 A | | 12/1996 | Farnos et al. |
| 5,647,304 A | | 7/1997 | Nyberg et al. |
| 5,670,122 A | | 9/1997 | Zamansky et al. |
| 5,674,459 A | | 10/1997 | Gohara et al. |
| 5,863,413 A | | 1/1999 | Caren et al. |
| 6,039,783 A | * | 3/2000 | Lueck et al. ................ 422/170 |

OTHER PUBLICATIONS

Article by Michelle Collins and Pictures by Quang Nguyen "KSC Joins Local University in NOx Study" Environmental Newsletter Apr. 1997 (NASA).

By Jordan M. Haywood and Dr. C. David Cooper "The Economic Feasibility of Using Hydrogen Peroxide for the Enhanced Oxidation and Removal of Nitrogen Oxides from Coal–Fired Power Plant Flue Gases" Technical Paper ISSN 1047–3289 J. Air & Waste Manage. Assoc. 48:238–246 (vol. 48/Mar. 1998) Journal of the Air & Waste Management Association).

By John M. Kasper, Christian A. Clausen, and C. David Cooper "Control of Nitrogen Oxide Emissions by Hydrogen Peroxide–Enhanced Gas–Phase Oxidation of Nitric Oxide" Journal of the Air & Waste Management Association vol. 46, Feb. 1996.

Authors: Michelle Collins, David C. Cooper, Christian Clausen "a Pilot–Scale Evaluation of A New Technology To Control Nitrogen Oxide Emissions From Boilers At Kennedy Space Center" Given at Annual NASA–KSC Partners in Education Conference Oct. 6–8, 1998.

By: M. M. Collins, D. D. Cooper, D. A. Clausen, J. D. Dietz, J. Tenney and D. Bonislawski "A Pilot–Scale Evaluation of a New Technology to Control Nitrogen Oxide (NOx) Emissions from Stationary Combustion Sources" NASA Technical Memorandum (Oct. 1998) #207196.

By: Michell M. Collins, C. David Cooper, Christian A. Clausen Loubna M. Tazi, Quang D. Nguyen "New Control Technology for Nitrogen Oxide Emissions from Stationary Combustion Sources" Annual Conference for PNWIS Conference (Nov. 1998).

By: Michelle M. Collins, C. David Cooper, Christian A. Clausen Loubna A. Tazi, and Quang D. Nguyen, "New Control Technology for Nitrogen Oxide Emissions from Stationary Combustion Sources" Paper published at AWMA Annual Conference (Jun. 1999).

By: C. David Cooper "New Control Technology for Nitrogen Oxide Emissions from Stationary Combustion Sources" 2nd Annual Partners in Education and Research Conference Oct. 5–7, 1999.

By: Michelle Collins, C. A. Clausen, C. D. Cooper, J. D. Dietz J. Tenney and D. Bonislawski "Pilot–Scale Evaluation of a New Technology to Control NOx Emissions from Stationary Combustion Sources" NASA Technical Memorandum #208545 (Jul. 1999).

* cited by examiner

*Primary Examiner*—Stanley S. Silverman
*Assistant Examiner*—Edward M. Johnson
(74) *Attorney, Agent, or Firm*—Randall M. Heald; Gary C. Borda; John G. Mannix (57) ABSTRACT

A method for removing $NO_X$ from gas streams emanating from stationary combustion sources and manufacturing plants utilizes the injection of hydrogen peroxide into the gas stream for rapid gas-phase oxidation of NO to $NO_2$ and water-soluble nitrogen acids $HNO_2$ and $HNO_3$. The nitrogen acids may be removed from the oxidized gas stream by wet scrubbing or by contact with a particulate alkaline material to form a nitrite/nitrate salt.

15 Claims, 5 Drawing Sheets

METHOD FOR REMOVAL OF NITROGEN OXIDES FROM STATIONARY COMBUSTION SOURCES

RELATED APPLICATION

This application is based upon prior filed copending provisional application Serial No. 60/163,045 filed Oct. 28, 1999.

ORIGIN OF INVENTION

The invention described herein was made in the performance of work under a NASA contract and by an employee of the United States Government and is subject to the provisions of Public Law 96-517 (35 U.S.C. §202) and may be manufactured and used by or for the Government for governmental purposes without the payment of any royalties thereon or therefore. In accordance with 35 U.S.C. §202, the contractor elected not to retain title.

FIELD OF THE INVENTION

The present invention relates generally to the field of pollution control, and, more particularly, to removing nitrogen oxides ($NO_X$) from effluent gases.

BACKGROUND OF THE INVENTION

Nitrogen oxides ($NO_X$) are criteria air pollutants which are emitted in large quantities from high temperature processing sources, such as fossil-fueled power plants, industrial boilers, waste incinerators, and manufacturing plants for the production of nitric acid, fertilizer, explosives, plastics, cement and metal products, for example. Two major constituents of $NO_X$ are nitric oxide (NO) and nitrogen dioxide ($NO_2$), which are considered to be large contributors to smog, acid rain and other deleterious environmental effects when discharged to the atmosphere. The quantity of $NO_X$ which may be discharged by a source is (or is expected to be) generally limited by governmental regulations. Because of the environmental concerns posed by air pollution, much research time and money has been expended to develop methods for controlling $NO_X$ emissions.

The reduction of $NO_X$ emissions from motor vehicle engines has been relatively successful, using catalytic converters. Improvements resulting from further developments appear to have diminishing benefits and incur high installed costs.

Inasmuch as a large portion of flue gas $NO_X$ is generated at stationary sources, removal efforts in the United States and elsewhere are now being directed to significantly reduce such $NO_X$ emissions. Current government enforced emission limits, which are often difficult to meet, are expected to become increasingly more stringent.

Stationary fossil-fuel fired power plants comprise a major source of flue gas emissions which contain both sulfur dioxide ($SO_2$) and nitrogen oxides ($NO_X$). Currently, emissions of $SO_2$ are much reduced at many coal-fired power plants by wet scrubbing of the flue gases with an alkaline water stream, but removal of $NO_X$ by scrubbing is largely unsuccessful. Nitric oxide (NO), a primary constituent of $NO_X$, has a very low water solubility and is not amenable to water scrubbing. As shown below in a comparison of values of Henry's constant in water at 25° C., nitrogen dioxide $NO_2$ has a much greater solubility than nitric oxide NO, and the nitrogen acids $HNO_2$ and $HNO_3$ are in turn much more soluble than $NO_2$.

Values of Henry's Constant H, atmosphere/mol fraction

| | |
|---|---|
| $N_2$ | 86,400 |
| NO | 28,700 |
| $NO_2$ | 113 |
| $N_2O_4$ | 0.71 |
| $HNO_2$ | 0.02 |
| $HNO_3$ | $4.8E^{-6}$ |
| $SO_2$ | 44 |

Because scrubbing of $NO_X$ from fossil-fuel power plant flue gases is largely ineffective, current $NO_X$ control methods primarily comprise combustion modifications, e.g. burners which are controlled to either limit the quantity of NO which is formed or reduce NO and $NO_2$ to elemental nitrogen gas $N_2$. Typically, such methods reduce $NO_X$ emissions by only about one-half, generally far less than is required to meet governmental restrictions. Furthermore, the burners are relatively costly.

A variety of post-combustion $NO_X$ removal methods which have been used or proposed may be classified as Selective Catalytic Reduction (SCR), Selective Non-Catalytic Reduction (SNCR) or Non-Selective Catalytic Reduction (NSCR). The Selective Catalytic Reduction (SCR) method involves the use of a catalyst system which selectively converts $NO_X$ to elemental nitrogen $N_2$, optionally using an added reductant such as ammonia, urea, etc. Examples of SCR methods are described in U.S. Pat. No. 5,520,895 of Sharma et al., U.S. Pat. No. 5,589,147 of Farnos et al. and U.S. Pat. No. 5,180,567 of Yoshimoto et al.

In a related process described in U.S. Pat. No. 5,489,421 of Van Velzen et al., NO in the flue gas is absorbed in a scrubbing liquor containing FeII-EDTA, desorbed and concentrated by vapor stripping, and catalytically converted to hydroxylamine.

SCR methods are used at only a few major power plant installations, because of very high capital costs and substantial operating expenses. The SNCR and NSCR methods have found little practical application because of low conversion efficiencies. It has been proposed in U.S. Pat. No. 5,120,508 of Jones to convert NO to nitrogen dioxide $NO_2$ by injecting a peroxyl initiator and oxygen into a flue gas stream, and removing the $NO_2$ from the treated flue gas with a particulate sorbent. The initiator is any of a great number of materials including (a) compounds containing only carbon and hydrogen, (b) compounds containing only carbon, hydrogen and oxygen, (c) compounds containing only hydrogen and oxygen, and (d) hydrogen $H_2$. Test results cited in the reference show NO conversions of up to about 83 percent, using propane as the peroxyl initiator. There is no indication in this reference of required concentrations of other initiators, or their effectiveness. The use of hydrocarbon initiators is expensive and consumptive of natural resources.

There are various references to the use of hydrogen peroxide in removing $NO_X$ from various source gases. For example, U.S. Pat. Nos. 4,182,278 of Coakwell and 5,647,304 of Nyberg et al. describe methods and apparatus for improving gasoline mileage and reducing emissions of an automobile engine by injecting water and an oxidant such as hydrogen peroxide into the engine's combustion chambers. Engine exhaust gases are passed through a catalytic burner. Similarly, in U.S. Pat. No. 5,863,413 of Caren et al., hydrogen peroxide is partially dissociated into hydroxyl radicals and injected into an automobile engine carburetor, an engine exhaust manifold, or into the catalytic burner.

The addition of hydrogen peroxide to scrubbing liquors for pollutant removal is shown in U.S. Pat. No. 3,733,393 of Couillaud et al. and in U.S. Pat. No. 5,151,258 of Gubanc et al. The Couillaud et al. reference indicates that the incoming scrubbing liquors contain about 41% $H_2O_2$ for removal of $SO_2$. The effectiveness of $NO_X$ removal is not indicated. The Gubanc et al. reference also indicates that a high concentration (0.5 to 10% or more) of hydrogen peroxide is added to the scrubbing liquor.

In a similar process described in U.S. Pat. 5,674,459 of Gohara, et al., flue gases are bubbled through diluted (18–20%) hydrogen peroxide containing recycled sulfuric acid and nitric acid. A portion of the liquors is drawn off and treated with limestone to produce gypsum.

In U.S. Pat. No. 5,670,122 of Zamansky et al., hydrogen peroxide or a mixture of hydrogen peroxide and methanol is injected into a flue gas stream. NO is converted to nitrogen dioxide $NO_2$ which is subsequently reduced to $N_2$ and removed.

Each of the processes indicated above has severe limitations. Those processes which achieve a relatively high removal of $NO_X$ have high capital and/or operating costs, making them generally unattractive. Processes with lower total costs do not achieve the desired high removal rates of $NO_X$. In the United States, the payment of fines for excessive $NO_X$ emissions is the norm for operating plants in many industries.

SUMMARY OF THE INVENTION

In view of the foregoing background, it is therefore an object of the invention to provide a method and apparatus for achieving high removals of $NO_X$ from flue gases of stationary combustion sources and manufacturing plants at lower cost.

This and other objects, features and advantages in accordance with the present invention are provided by a method for removing $NO_X$ from gas streams emanating from stationary combustion sources and manufacturing plants wherein hydrogen peroxide is injected into the gas stream under conditions which will rapidly oxidize $NO_X$ species in gas-phase reactions. Nitric oxide NO is rapidly oxidized to nitrogen dioxide $NO_2$. $NO_2$ is further oxidized to nitrous acid $HNO_2$ and nitric acid $HNO_3$. These nitrogen oxyacids are much more water-soluble than nitric oxide NO (and even $NO_2$), and may be removed by wet scrubbing of the oxidized gas stream, or by passing the oxidized gas stream through a particulate alkaline material to form a nitrite/nitrate salt. For example, electric power plants burning fossil fuels and using wet scrubbing to remove $SO_2$ from the flue gas may be retrofitted so that enhanced simultaneous removal of $NO_X$ and $SO_2$ is achieved.

Another aspect of the invention relates to an apparatus for removing $NO_X$ from a flue gas stream. The apparatus may include a reactor for injecting an oxidizing stream of hydrogen peroxide ($H_2O_2$) into the flue gas stream under gas-phase reaction conditions at which nitrogen oxides are oxidized to $NO_2$ and at least one of water-soluble nitrogen oxyacids $HNO_2$ and $HNO_3$, and an acid remover downstream from the reactor for removing the water-soluble nitrogen oxyacids from the flue gas stream.

DETAILED DESCRIPTION OF THE PREFERRED EMBODIMENTS

The present invention will now be described more fully hereinafter with reference to the accompanying drawings, in which preferred embodiments of the invention are shown. However, this invention may be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

The term "flue gas" as used herein refers to a gaseous stream from which it is desired to remove nitrogen oxides ($NO_X$), from a fixed or stationary source, as opposed to exhaust gas discharged from an internal combustion engine, for example. Stationary sources of flue gases containing $NO_X$ include for example, power plants, boilers, incinerators, and/or manufacturing facilities in which nitric acid is generated or utilized.

In the present invention, nitric oxide NO is reacted with hydrogen peroxide and its radicals to form $NO_2$ which further reacts to form nitrogen oxyacids. Then, $NO_2$ and the oxyacids, e.g. nitrous acid $HNO_2$ and nitric acid $HNO_3$, may be readily removed because of their high water solubility or their high reactivity with alkaline compounds to form salts.

Depending on the specific conditions, $H_2O_2$ may decompose to (a) OH and OH, (b) $HO_2$ +H, (c) $H_2O+O_2$, or (d) $H_2O+HO_2$. In the present invention, it is beneficial to provide conditions such that $H_2O_2$ largely decomposes to hydroxyl radical OH.

In $NO_X$ treatment, a large number of chemical reactions may be hypothesized. In the present invention, the general reactions leading to $NO_X$ oxidation are believed to include the following:

| | |
|---|---|
| $H_2O_2 \rightarrow 2OH$ | (Reaction 1) |
| $H_2O_2 + OH \rightarrow HO_2 + H_2O$ | (Reaction 2) |
| $NO + HO_2 \rightarrow NO_2 + OH$ | (Reaction 3) |
| $NO_2 + OH \rightarrow HNO_3$ | (Reaction 4) |
| $NO + OH \rightarrow HNO_2$ | (Reaction 5) |

At temperatures above about 400° C., reaction kinetics and equilibrium favors the production of $NO_2$ and $HNO_3$. At lower temperatures, the conversion of NO is somewhat lower.

Figure 1:
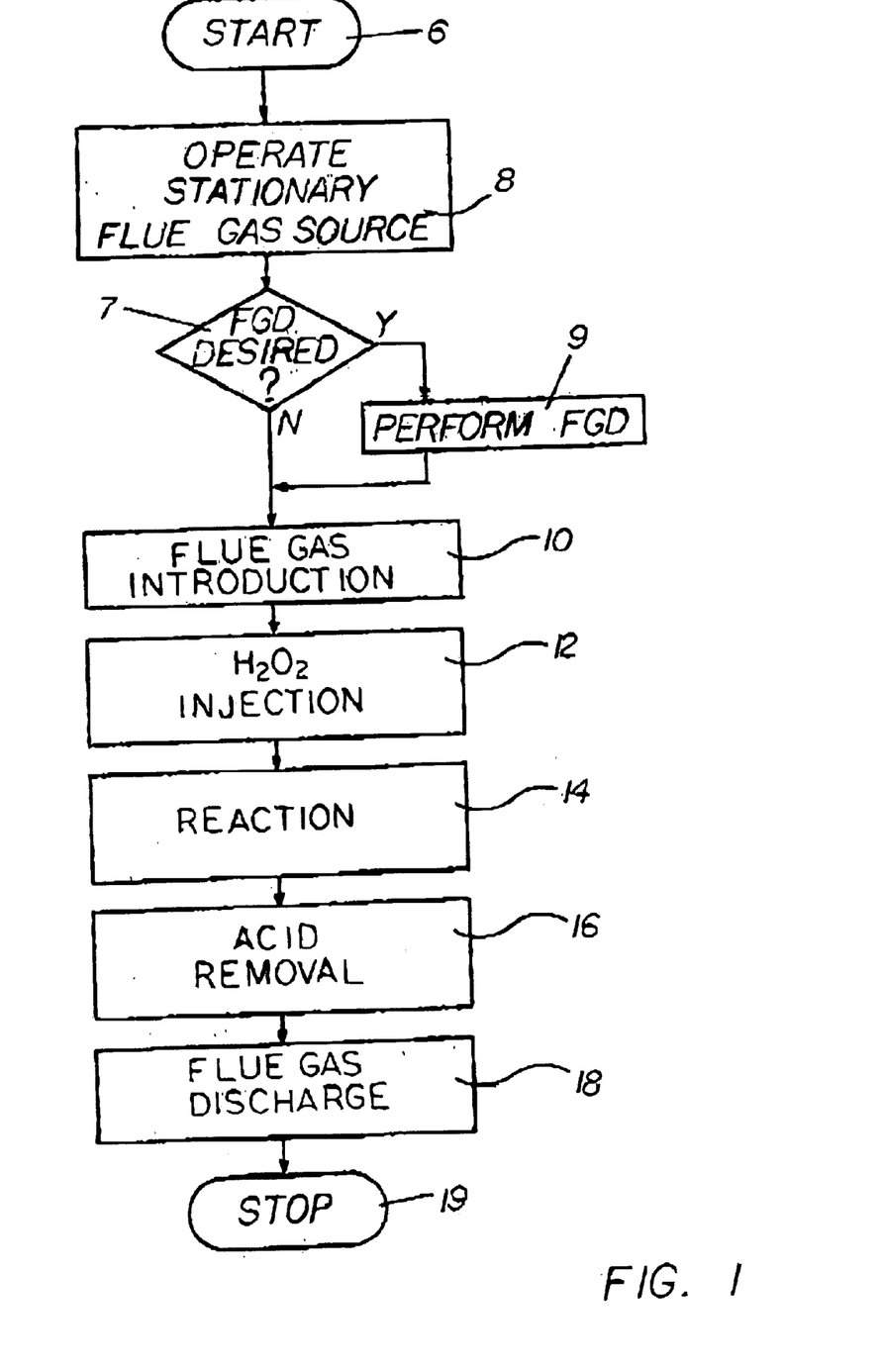
FIG. 1 is a flow chart generally illustrating the steps in a process for removing $NO_X$ from a stationary source flue gas in accordance with the present invention.

Referring now to the flowchart of FIG. 1, the steps of the process for treating flue gas are now described. From the start (Block 6) the stationary source is operated, generating the flue gas at Block 8. General sequential treatment steps exemplary of a method of the present invention include: flue gas introduction (Block 10) comprising passing a flue gas stream from the stationary source to a hydrogen peroxide injection step at Block 12 wherein a stream of $H_2O_2$ is injected into the flue gas. At Block 14 a reaction is performed in which the stream of $H_2O_2$ is intimately mixed with the flue gas and reacted therewith. Accordingly, a major portion of the NO is oxidized to $NO_2$ and the nitrogen acids.

The method further illustratively includes acid removal (Block 16) wherein $NO_2$ and nitrogen acids are separated and removed from the flue gas. Thereafter the flue gas is discharged having a low $NO_X$ content, at Block 18, before stopping at Block 19.

Combustion of fossil fuels, e.g. coal or oil may lead to large quantities of sulfur dioxide $SO_2$ in the flue gases. The $SO_2$ may be simultaneously removed as $H_2SO_4$ together with the nitrogen acids in the acid removal step (Block 16).

Optionally, the flue gas may be first subjected to a flue gas desulfurization (FGD) processing at Block 9 prior to the flue gas introduction (Block 10), whereby a large portion of the sulfur dioxide $SO_2$ is removed before treatment to remove the $NO_X$. Various FGD systems are well known in the art and typically include scrubbing of the flue gas with an alkaline liquor.

An exemplary embodiment of the apparatus 20 in accordance with the present invention is further explained with reference to FIG. 2. A flue gas 22 containing $NO_X$ is generated by a stationary source 21, such as a fossil-fuel fired power plant or boiler. The flue gas 22 from stationary source 21 may optionally be first passed through flue gas desulfurization (FGD) stage or apparatus 24 to convert $SO_2$ to an FGD product 25, e.g. sulfuric acid $H_2SO_4$ or gypsum $CaSO_4$, which is separated from the flue gas.

As indicated above, in an alternative arrangement, sulfur dioxide ($SO_2$) in the flue gas 22 may be converted to sulfuric acid simultaneously with $NO_X$ oxidation in a reaction step and reaction products of both sulfur and nitrogen removed together from the oxidized flue gas stream 56 in a subsequent acid removal apparatus 36. In any case, the flue gas 22, with or without $SO_2$, is passed to reactor 28 for $NO_X$ conversion to nitrogen acids before ultimately being released as the treated flue gas 40.

To achieve the desired conversion of NO to $NO_2$ and nitrogen acids, a stream 30 including hydrogen peroxide $H_2O_2$ from a $H_2O_2$ source 32 is illustratively injected into the flue gas 22 i.e. into the reactor 28, in a manner which results in rapid effective gas-phase mixing and reaction as will be appreciated by those skilled in the art. The hydrogen peroxide from the source 32 is typically a water solution, and may be injected into the reactor 28 as a liquid stream 30 which rapidly evaporates upon injection. For example, the $H_2O_2$ concentration may be less than about 70% by weight, and equal to or greater than about 35% as is a typical commercially available concentration, depending on local economic and safety considerations.

The concentration of the $H_2O_2$ in the stream 30 may be adjusted to achieve the desired $H_2O_2/NO_X$ ratio at a volumetric injection rate which produces rapid distribution and contact of the $H_2O_2$ stream with the flue gas 22.

Alternatively, the hydrogen peroxide stream 30 may be injected as an atomized stream or be first pre-vaporized in pre-vaporization apparatus such as is known in the art and described in greater detail below in an alternate embodiment.

The molar ratio of $H_2O_2$ to $NO_X$ required in the oxidation reaction may vary from about 0.5 to about 3.0 or more, for reaction temperatures of about 400–650° C. At lower reaction temperatures, the $H_2O_2/NO_X$ ratio may be somewhat higher, with a maximum value of about 8.0.

The minimum reaction time in the reactor 28 to attain adequate completion of the reaction is relatively short, typically in a range from about 0.1 seconds to about 3 seconds at 400 to 650° C., and from about 0.1 seconds to somewhat longer at lower reaction temperatures, of up to about 5 seconds.

Prior to injection of the hydrogen peroxide stream 30, the flue gas temperature may be adjusted to a desired reaction temperature ranging from ambient, i.e. about 20° C., to about 650° C., depending upon the $NO_X$ concentration and concentration of other constituents, such as $SO_2$, in the flue gas stream. For most power plant applications, the flue gases are hot, and a reaction temperature of about 300° C. to about 600° C. is preferred. A more preferred reaction temperature may typically be from about 450° C. to about 550° C. For flue gases from sources where the flue gas temperature is lower, the steady-state NO conversion may be lower.

Figure 3:
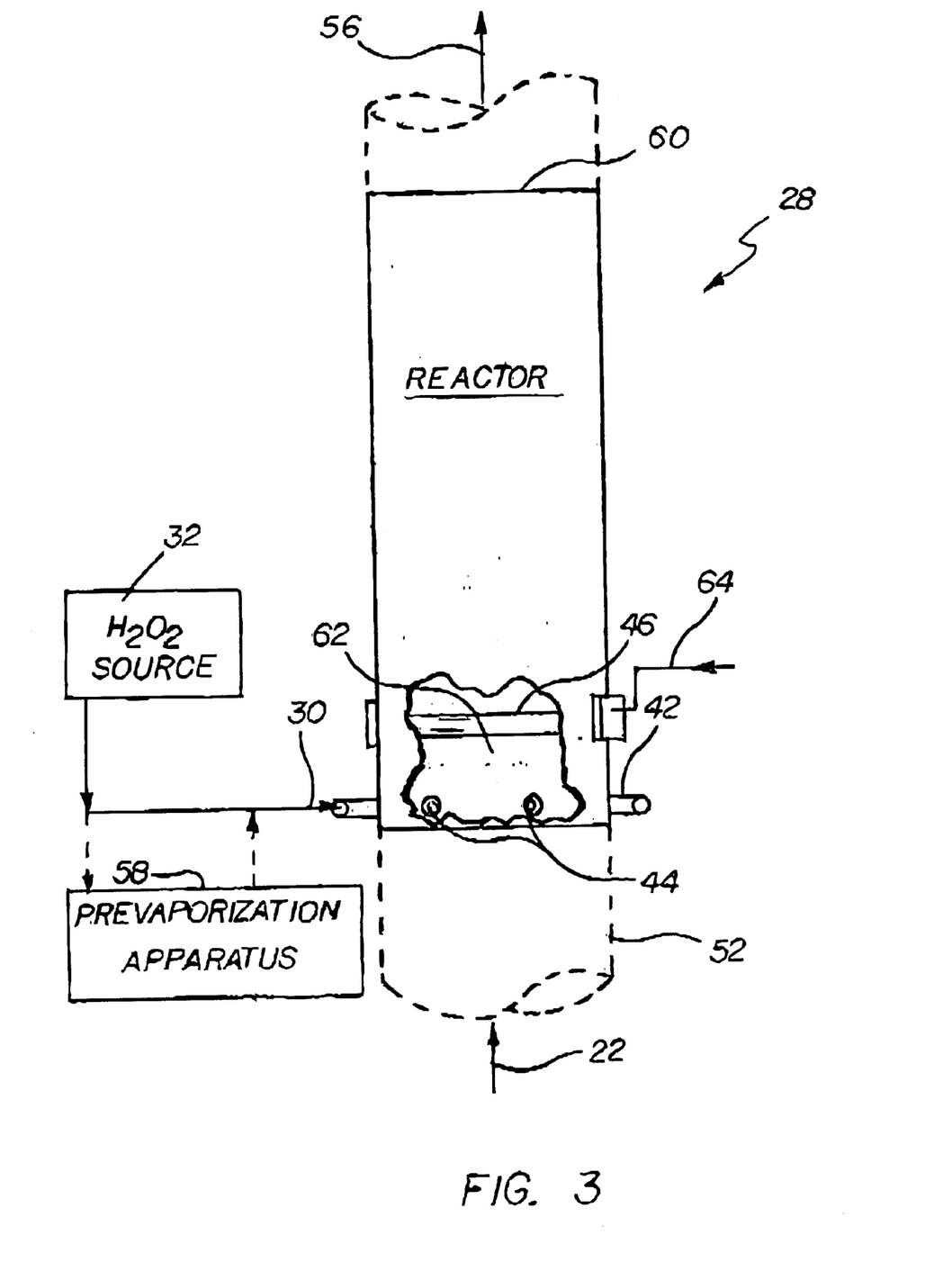
FIG. 3 is a schematic view of a gas-phase reactor as shown in FIG. 2 for oxidizing flue gas $NO_2$ to $NO_2$ and nitrogen oxyacids.

As depicted in FIG. 3, the reactor 28 may be a separate item of equipment specially constructed, or it may simply comprise a portion 60 of an existing exhaust gas flue 52, modified by installation of $H_2O_2$ injection apparatus 42. The injection apparatus 42 may comprise one or more nozzles 44 spaced within a cross-section of the reactor 28 to uniformly disperse the $H_2O_2$ stream 30 from an $H_2O_2$ source 32 into the incoming flue gas 22. The velocity of the $H_2O_2$ stream 30 at the nozzles 44 should be sufficient to achieve rapid intimate mixing in the reactor 28. The injection nozzles must serve at least three functions. First, the liquid hydrogen peroxide must be kept cool enough while inside the nozzle that it does not decompose before being sprayed into the flue gas stream 22 within the reactor 28. Therefore the nozzle exterior must be insulated from the hot flue gas. The nozzle may also be cooled, for example, to about 100° C. Second, the nozzles must be placed in the proper location within the flue gas so that the temperature is right for the desired reactions to occur. The optimum temperature for the desired reactions is about 930° F., and temperature can vary with position in the flue gas stream (both radially and longitudinally). The nozzles must be placed so that the spray of peroxide droplets does not impinge on the walls, and is not in a zone of gases that is too hot nor too cold. Third, the nozzles must eject the hydrogen peroxide so that it forms tiny droplets that can evaporate rapidly when exposed to the hot flue gas stream, and allow the evaporated vapors to mix thoroughly with the flue gas. This atomization may be caused by an ultrasonic means (as was used in Example 2, described several pages following) or by a more traditional means as explained in the next paragraph.

The nozzles 44 may be configured to atomize the stream 30 comprising a solution of $H_2O_2$ in water, using mechanical, pressure, steam-assisted or air-assisted atomization. Alternatively, pre-vaporized $H_2O_2$ generated by the pre-vaporization apparatus 58 may be injected. The dimensions of the reactor 28 should provide the desired residence time to complete the nitrogen oxidation and transport the oxidized flue gas 56 to the acid removal apparatus 36.

In one embodiment, the reactor 28 may be configured to expose the gaseous reaction mixture 62 to ultraviolet (UV) radiation. A group of UV lamps 46 may be spaced across the reactor cross-section to provide UV radiation to the reaction mixture 62 within the reactor 28. Use of broad-spectrum UV radiation has been found to stimulate the NO oxidation reactions and may be particularly useful where the degree of oxidation is otherwise less than desired, e.g where the temperature of the flue gas 22 is at a lower value, e.g. from ambient to about 400° C. When the reactor 28 is operating at elevated temperatures, the UV lamps 46 may be enclosed within cooling passages and air cooled by a stream 64 of air blown over the lamps.

Figure 2:
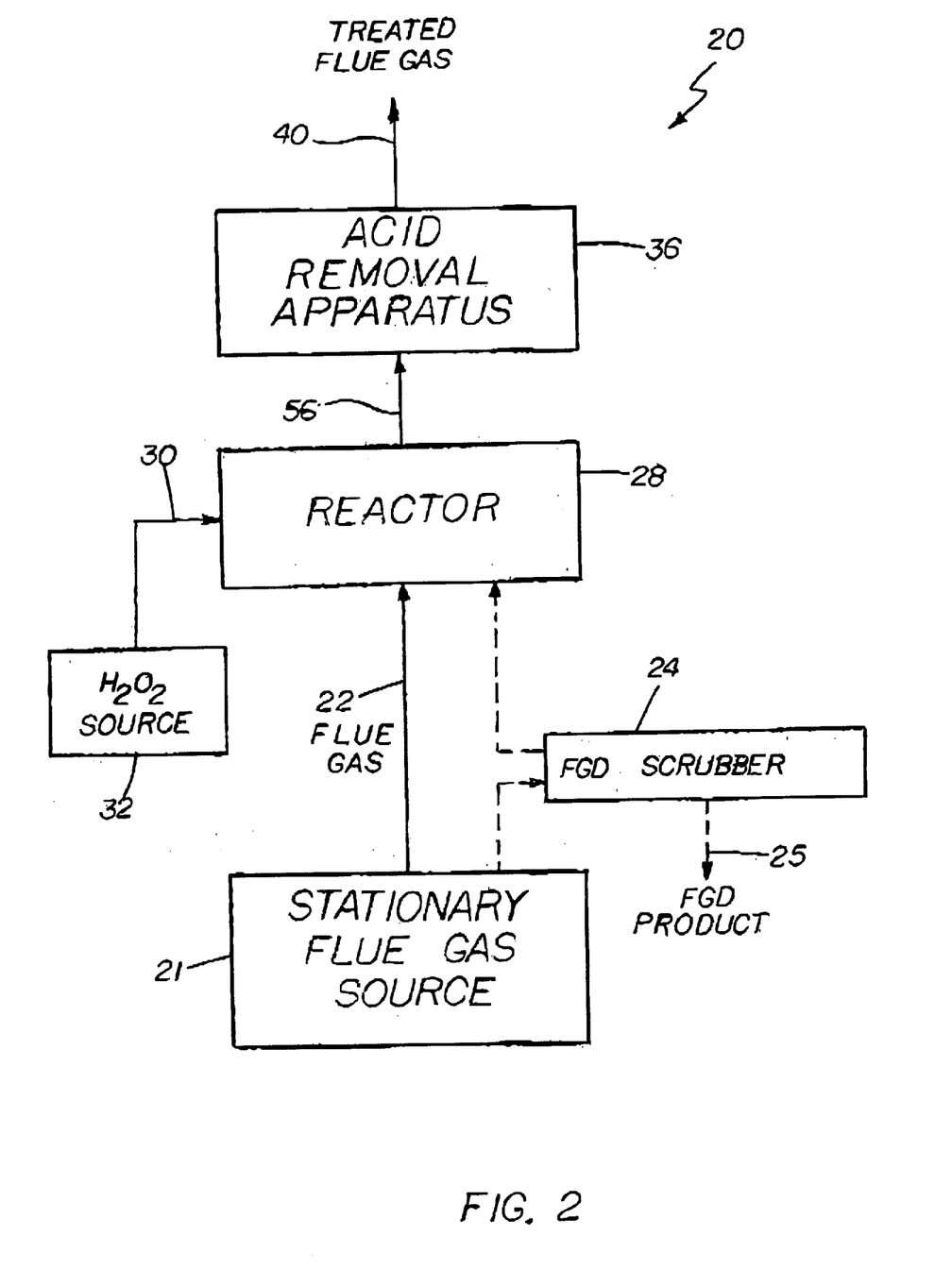
FIG. 2 is a schematic block diagram of an apparatus for removing $NO_X$ from a stationary source flue gas in accordance with the present invention.

As shown in FIG. 2, the nitrogen acids and a portion of the residual $NO_X$ are removed from the oxidized flue gas 56 by an acid removal apparatus 36. Various acid removal processes are known, but two particular examples will be discussed herein.

Figure 4:
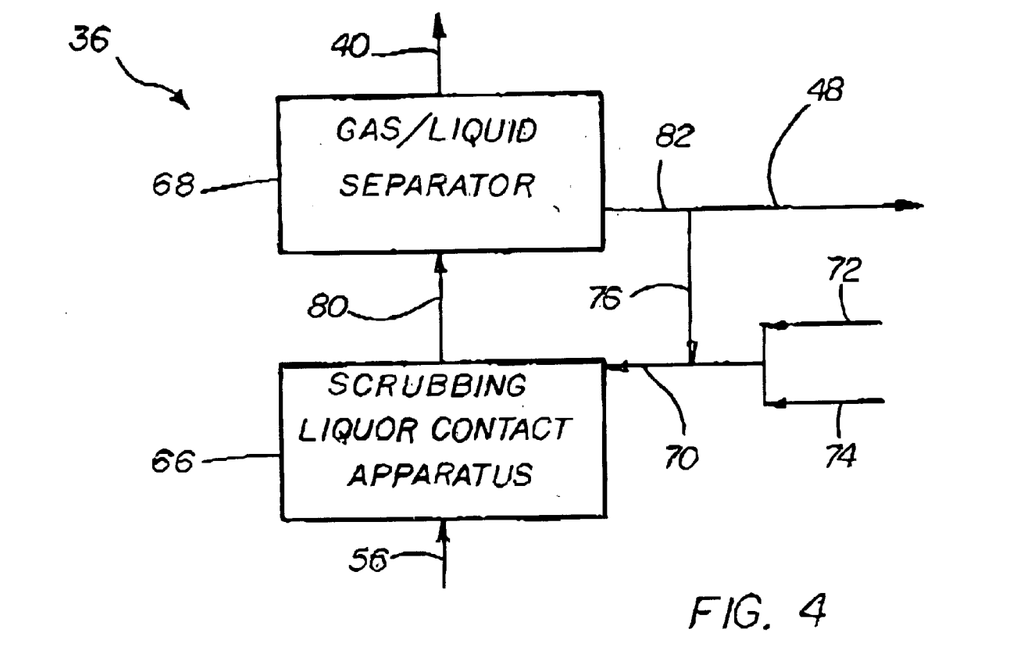
FIG. 4 is a schematic block diagram of an embodiment of oxyacid remover step as used in the apparatus of FIG. 2.

In a first acid removal embodiment, depicted in FIG. 4, the stream of oxidized flue gases 56 is passed to a contact or scrubber apparatus 66 where the oxidized flue gases are intimately contacted with an aqueous scrubbing liquor 70 into which the $NO_2$ and nitrogen acids become dissolved. The scrubbed flue gases and scrubbing liquor 80 containing nitrogen acids are then separated in a gas/liquid separator 68. The contact apparatus 66 and separator 68 of FIG. 4 together comprise the acid removal apparatus 36 shown in FIG. 2, and may be a conventional wet scrubber apparatus as known in the art. The wet scrubber may comprise a plurality of stages, with countercurrent operation.

The separator 68 may also include apparatus for removing any remaining liquid droplets from the scrubbed oxidized separated flue gases before they are discharged as cleaned flue gas 40 to the atmosphere or directed to a further treatment step. As shown in FIG. 4, the separated liquors 82 may be totally discharged as stream 48, or a portion 76 may be recycled to the contact apparatus 66 to become part of the scrubbing liquor 70.

The scrubbing liquor 70 may be simply water 72 that may or may not be recycled, or may include an alkaline material 74 to control the liquor at a particular pH value, for example at a value within a range of pH 4 to pH 10. The pH may be adjusted with any suitable alkaline material 74, e.g. sodium hydroxide, calcium hydroxide, or potassium hydroxide, depending upon the intended disposition of the final product as will be readily appreciated by those skilled in the art.

Figure 5:
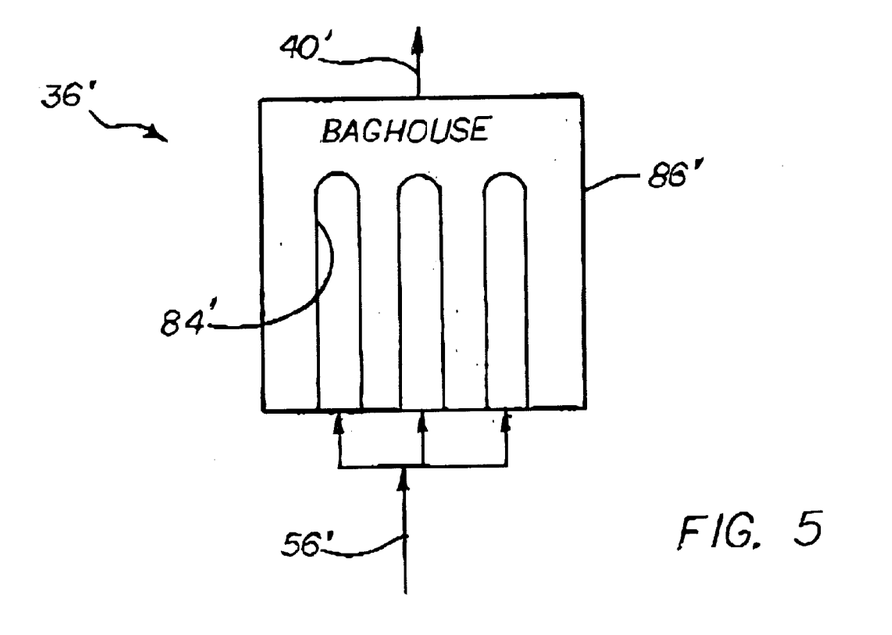
FIG. 5 is a schematic view of an alternative oxyacid remover as may be used in the apparatus of FIG. 2.

A second embodiment of an acid removal apparatus 36' is illustrated in FIG. 5, in which the oxidized flue gases 56' are contacted with particulate alkaline materials 84' which absorb the nitrogen acids. For example, the alkaline materials 84' may be supported on fabric in a conventional "baghouse" 86' and react with the nitrogen acids to form nitrate and nitrite salts.

It should be noted that where the incoming flue gas contains $SO_2$, the resulting oxidized liquors 48 of FIG. 4 will also contain sulfuric acid and/or its reaction products. Likewise, the salts of both sulfur and nitrogen will form in a baghouse operation.

EXAMPLE 1

A small scale test apparatus included a narrow bore quartz tube reactor enclosed in an electrically heated oven. The reactor was approximately 2.5 meters long and had an inside diameter of about 6 mm. A stream of air augmented with nitric oxide (NO) was passed through the tube reactor. The system was designed so that $H_2O_2$, water, or $H_2O_2$ and water could be injected into the heated air stream to test the effects on conversion of NO to $NO_2$ and/or $HNO_2$ and/or $HNO_3$. Gases exiting from the reactor were diluted with room temperature air to quench the reactions, and then were analyzed for NO, $NO_2$, $HNO_2$, and $HNO_3$.

In a first series of tests, the effect of reaction temperature upon overall NO conversion was evaluated. $H_2O_2$ was injected through a hypodermic needle into the incoming gas containing 500 ppm $NO_X$, achieving an $H_2O_2$ concentration of 1200 ppm. The results were as follows:

| Temp. ° C. | % Oxidation of NO |
|---|---|
| 300 | 24 |
| 350 | 29 |
| 400 | 39 |
| 450 | 80 |
| 500 | 98 |
| 550 | 98 |
| 600 | 93 |
| 650 | 89 |
| 700 | 79 |

In a second series of tests, sampling indicated that the maximum conversion of NO under the particular reactor conditions was complete in about 0.3 seconds.

In a third series of tests, the effect of hydrogen peroxide concentration upon NO conversion was evaluated, all tests conducted at 500° C. (932° F.) and a reactor residence time of 0.7 seconds. The operating conditions and species concentrations in parts per million (ppm) were as follows:

|      | Reactor |        |     | Out | Scrubber Gas |        |           |         | % NO  |
|------|---------|--------|-----|-----|--------------|--------|-----------|---------|-------|
|      | In      |        | Out |     | Out          |        |           |         |       |
| Test | $H_2O_2$ | $NO_x$ | NO  | NO  | NO           | $NO_2$ | $NO_2$—N | $NO_3$—N | Conv. |
| 1.   | 0       | 496    | 467 | 451 | 407          | 25     | 0.96      | 0.83    | 13    |
| 2.   | 123     | 515    | 483 | 445 | 388          | 42     | 1.47      | 0.60    | 20    |
| 3.   | 247     | 499    | 469 | 335 | 289          | 53     | 2.71      | 1.14    | 38    |
| 4.   | 483     | 503    | 470 | 273 | 195          | 85     | 3.36      | 1.37    | 59    |
| 5.   | 726     | 495    | 463 | 114 | 103          | 119    | 3.32      | 2.12    | 78    |
| 6.   | 971     | 507    | 477 | 80  | 83           | 135    | 3.17      | 2.49    | 83    |
| 7.   | 1222    | 505    | 472 | 14  | 8            | 138    | 3.26      | 3.22    | 98    |

EXAMPLE 2

A test apparatus included a natural gas burner and chamber for producing a flue gas into which NO and/or $SO_2$ could be injected for simulating various flue gas sources. A stream of flue gas was taken from a natural gas boiler at the central heating plant at Kennedy Space Center, and augmented with NO and/or $SO_2$. The augmented flue gas was passed through a long pipe reactor into which a stream of $H_2O_2$ was injected. A reaction zone comprised an 8-foot long section of 1-foot diameter stainless steel pipe. Various methods for injecting the $H_2O_2$ were evaluated, including a metered pump with drilled plugs, air-aspirated nozzles and ultrasonic nozzles. The goal was to inject the $H_2O_2$ in the form of small droplets into the flue gas.

Gases from the reactor were passed into a quench section and a conventional packed tower scrubber. The scrubber comprised a 6-foot deep bed of Hiflow™ polypropylene packing and was designed for a gas flow rate of 0–500 scfm and a liquid flow rate of 0–35 gpm. In most of the tests, sodium bicarbonate was used to adjust the pH of scrubbing liquor in a 200 gallon liquor reservoir.

Samples were obtained at various locations in the treatment train and analyzed for nitrogen and sulfur species.

Figure 6:
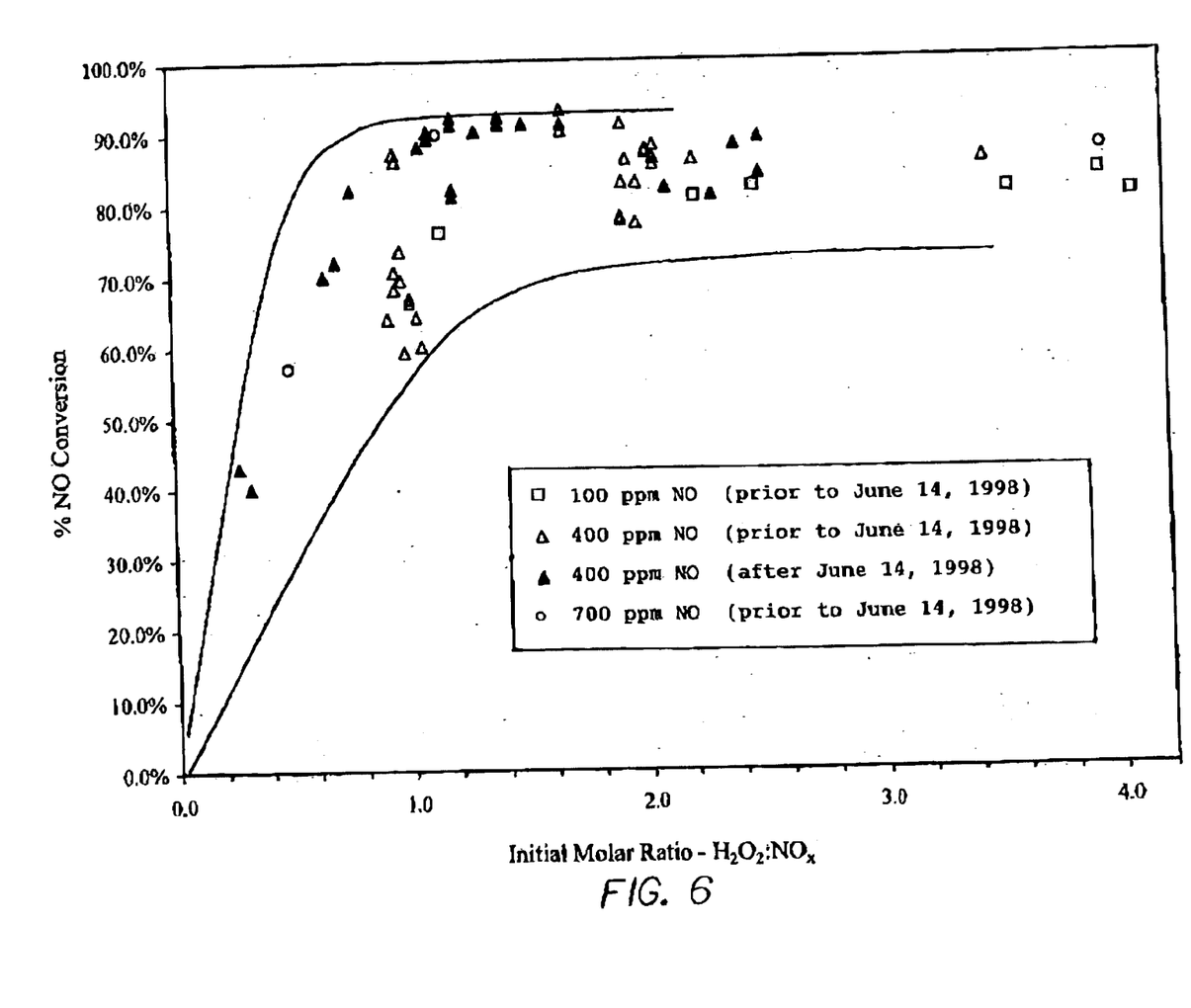
FIG. 6 is a graphical presentation of controlled variables and results obtained in tests of the invention described in Example 2 of the following specification.

In a first series of tests, hydrogen peroxide was injected through an ultrasonic nozzle into the hot flue gases. The effect of increasing the molar ratio of hydrogen peroxide to $NO_x$ on the degree of NO conversion was demonstrated, as depicted in FIG. 6.

A second series of tests was conducted, with and without the presence of $SO_2$ in the flue gases. The test data showed that both NO and $SO_2$ are oxidized simultaneously by hydrogen peroxide. The somewhat higher conversions beginning Jun. 14, 1998 may be attributed to improvements in achieving a desirable small-droplet $H_2O_2$ injection stream, an optimized injection location, and in general improved operation of the apparatus.

In this series of tests, the goal was operation at a reactor temperature of 500° C. (932° F.). The $SO_2$ was injected to obtain approximate concentrations of 0, 225, 450, and 900 ppm in the flue gas.

In the following table, the molar ratio of hydrogen peroxide to incoming flue gas $NO_x$ is designated HPR. The experimental design included test runs at molar ratios HPR of 0.25, 0.5, 1.0 and 2.0.

| Test |       |      | Concentration, ppm |         |        |               |        |         | Percent Conversion |        |
|------|-------|------|--------------------|---------|--------|---------------|--------|---------|--------------------|--------|
|      |       |      | Reactor Inlet      |         |        | Reactor Outlet |        |         |                    |        |
| No.  | ° F.  | HPR  | $H_2O_2$           | $NO_x$  | $SO_2$ | NO            | $NO_2$ | $HNO_x$ | NO                 | $NO_x$ |
| 1    | 921   | 1.92 | 652                | 340     | 0      | 53            | 219    | 68      | 84                 | 20     |
| 2    | 930   | 0.96 | 328                | 340     | 0      | 30            | 226    | 83      | 91                 | 24     |
| 3    | 931   | 0.97 | 327                | 337     | 0      | 27            | 232    | 78      | 92                 | 23     |
| 4    | 933   | 0.48 | 163                | 337     | 0      | 97            | 153    | 87      | 70                 | 26     |
| 5    | 929   | 0.93 | 305                | 330     | 0      | 62            | 193    | 75      | 81                 | 23     |
| 6    | 926   | 1.85 | 610                | 330     | 0      | 59            | 210    | 60      | 81                 | 18     |
| 7    | 937   | 0.23 | 80                 | 350     | 0      | 201           | 121    | 28      | 40                 | 8      |
| 8    | 939   | 0.94 | 328                | 350     | 0      | 35            | 232    | 84      | 90                 | 24     |
| 9    | 957   | 0.89 | 311                | 349     | 0      | 31            | 253    | 65      | 91                 | 18     |
| 10   | 965   | 0.88 | 313                | 355     | 0      | 32            | 259    | 64      | 90                 | 18     |
| 11   | 937   | 0.86 | 309                | 358     | 0      | 39            | 200    | 119     | 88                 | 33     |
| 12   | 944   | 0.96 | 333                | 347     | 0      | 31            | 194    | 121     | 90                 | 35     |
| 13   | 925   | 1.92 | 655                | 341     | 480    | 35            | 195    | 110     | 89                 | 32     |
| 14   | 928   | 0.96 | 328                | 341     | 480    | 26            | 197    | 118     | 92                 | 34     |
| 15   | 930   | 0.95 | 282                | 298     | 250    | 25            | 173    | 100     | 91                 | 34     |
| 16   | 925   | 0.97 | 324                | 334     | 500    | 29            | 205    | 99      | 91                 | 30     |
| 17   | 941   | 0.49 | 164                | 332     | 500    | 93            | 154    | 85      | 72                 | 26     |

-continued

| Test | | | Concentration, ppm | | | | | | Percent Conversion | |
|---|---|---|---|---|---|---|---|---|---|---|
| | | | Reactor Inlet | | | Reactor Outlet | | | | |
| No. | °F. | HPR | $H_2O_2$ | $NO_x$ | $SO_2$ | NO | $NO_2$ | $HNO_x$ | NO | $NO_x$ |
| 18 | 928 | 1.97 | 654 | 332 | 500 | 39 | 185 | 108 | 88 | 32 |
| 19 | 935 | 0.49 | 164 | 332 | 900 | 59 | 154 | 118 | 82 | 36 |
| 20 | 931 | 0.97 | 332 | 342 | 450 | 32 | 176 | 134 | 90 | 39 |
| 21 | 933 | 0.97 | 332 | 342 | 900 | 37 | 188 | 117 | 89 | 34 |
| 22 | 935 | 1.94 | 664 | 342 | 900 | 32 | 175 | 135 | 90 | 39 |
| 23 | 937 | 0.92 | 305 | 330 | 500 | 56 | 184 | 90 | 82 | 27 |
| 24 | 933 | 0.94 | 330 | 350 | 450 | 39 | 208 | 103 | 88 | 29 |
| 25 | 937 | 0.23 | 81 | 350 | 450 | 190 | 87 | 73 | 43 | 21 |
| 26 | 927 | 1.12 | 387 | 347 | 200 | 39 | 162 | 146 | 88 | 42 |

EXAMPLE 3

In theory, ultraviolet radiation enhance the production of hydroxyl radicals from $H_2O_2$. Test were conducted to determine any such effect upon NO conversion in a $NO_X$ oxidation reactor.

The test apparatus used in Example 2 was modified by installing two 4-Kw UV lamps across the diamerter of the reactor. The lamp output was borad spectrum in the 200–400 nm range. The UV lamps were enclosed within an outer quaetz tube thourgh which cooling air was passed.

| UV Lamp | NO (ppm) | SO2 (ppm) | T, oF | Molar Ratio | % NO Conv CV9 | % NOx Conv. CV9 |
|---|---|---|---|---|---|---|
| 1 | 400 | 0 | 243 | 1.81 | 6.0 | 3.9 |
| 1 | 400 | 0 | 244 | 4.15 | 16.8 | 8.0 |
| 1 | 400 | 0 | 247 | 0.84 | 7.1 | 4.4 |
| 1 | 400 | 0 | 248 | 1.84 | 6.6 | 4.4 |
| 1 | 200 | 0 | 249 | 3.04 | 12.5 | 6.7 |
| 1 | 200 | 0 | 252 | 6.29 | 22.4 | 9.7 |
| 1 | 200 | 0 | 440 | 3.07 | 20.7 | 7.4 |
| 1 | 400 | 0 | 440 | 2.2 | 18.3 | 10.1 |
| 1 | 400 | 0 | 443 | 1.26 | 10.0 | 4.8 |
| 1 | 400 | 0 | 628 | 2.13 | 17.4 | 15.0 |
| 1 | 400 | 0 | 628 | 2.13 | 15.0 | 11.1 |
| 1 | 400 | 0 | 630 | 2.5 | 23.0 | 10.2 |
| 1 | 200 | 0 | 662 | 2.46 | 51.0 | 20.1 |
| 1 | 400 | 0 | 660 | 1.23 | 69.5 | 69.6 |
| 1 | 200 | 200 | 260 | 6.29 | 25.0 | 10.8 |
| 1 | 200 | 200 | 433 | 3.06 | 21.5 | 6.6 |
| 1 | 200 | 200 | 659 | 2.5 | 52.6 | 20.7 |
| 1 | 400 | 400 | 243 | 4.03 | 20.0 | 9.5 |
| 1 | 400 | 400 | 244 | 1.34 | 8.6 | 6.3 |
| 1 | 400 | 400 | 246 | 0.84 | 6.7 | 4.6 |
| 1 | 400 | 400 | 462 | 2.26 | 23.0 | 13.5 |
| 1 | 400 | 400 | 463 | 1.41 | 16.5 | 9.8 |
| 1 | 400 | 400 | 630 | 2.46 | 27.7 | 14.2 |
| 1 | 400 | 400 | 644 | 2.46 | 29.8 | 14.4 |
| 2 | 400 | 0 | 253 | 2.98 | 18.0 | 9.1 |
| 2 | 200 | 0 | 260 | 3.03 | 15.9 | 10.3 |
| 2 | 400 | 0 | 280 | 1.83 | 7.0 | 5.3 |
| 2 | 200 | 0 | 290 | 6.32 | 33.7 | 16.1 |
| 2 | 200 | 0 | 454 | 5.71 | 46.4 | 19.3 |
| 2 | 200 | 0 | 460 | 4.57 | 36.2 | 14.7 |
| 2 | 400 | 0 | 465 | 2.36 | 22.2 | 11.2 |
| 2 | 400 | 0 | 468 | 1.3 | 15.1 | 8.2 |
| 2 | 200 | 0 | 620 | 4.41 | 60.5 | 31.3 |
| 2 | 400 | 0 | 620 | 2.13 | 20.6 | 17.7 |
| 2 | 400 | 0 | 630 | 2.5 | 35.3 | 15.8 |
| 2 | 200 | 0 | 631 | 2.31 | 36.1 | 18.6 |
| 2 | 200 | 0 | 660 | 7.24 | 72.1 | 24.9 |
| 2 | 200 | 200 | 278 | 5.52 | 35.6 | 16.3 |
| 2 | 200 | 200 | 465 | 4.12 | 41.1 | 18.8 |
| 2 | 200 | 200 | 636 | 4.33 | 72.2 | 41.2 |
| 2 | 400 | 400 | 253 | 2.93 | 24.3 | 13.4 |
| 2 | 400 | 400 | 264 | 2.5 | 24.0 | 11.5 |
| 2 | 400 | 400 | 264 | 2.5 | 36.0 | 17.7 |
| 2 | 400 | 400 | 471 | 2.26 | 25.5 | 13.8 |
| 2 | 400 | 400 | 474 | 1.37 | 17.1 | 9.2 |
| 2 | 400 | 400 | 630 | 2.5 | 37.2 | 17.9 |

The percentage of NO conversion is calculated from $(NO_{in} - NO_{out})/NO_{in}$. The percentage of NOx conversion is calculated from $((NO + NO_2)_{in} - (NO + NO_2)_{out})/(NO + NO_2)_{in}$.

The measured effects of UV radiation upon overall NO conversion from a large number of tests may be summarized as follows:

a. Oxidation of NO was enhanced by exposure to UV radiation;
b. the degree of oxidation was affected by the UV radiation output; and
c. the enhancement in oxidation was greater at the higher temperatures.

Scale-up of these small-scale laboratory and pilot tests must take into account the increased surface effects in small reactors. In this context, surface effects (particularly those of stainless steel) are known to inhibit oxidation.

The use of $H_2O_2$ for removing $NO_X$ from flue gases in accordance with the methods and apparatus described has numerous advantages. As shown in the actual pilot tests, NO conversions were achievable for $H_2O_2$:NO molar ratios as low as 1:1. These NO conversions were significantly improved over the laboratory tests of Example 1, where equivalent NO conversions required $H_2O_2$:NO molar ratios of about 2:1. Significant conversion to nitrogen oxyacids was accomplished. Very high overall removals of $NO_X$ were achieved by caustic scrubbing of the $H_2O_2$ treated flue gases.

Thus, a high $NO_X$ removal may be obtained without using an expensive catalytic system. In contrast to other non-catalytic systems, the only reactant added to the flue gas is $H_2O_2$.

In this invention, there is no need to add hydrocarbons such as methanol, propane, and the like, which may actually introduce an additional contaminant to the flue gas. Use of this invention conserves resources and reduces operating costs. The method may be incorporated into a conventional $SO_2$ scrubbing system for simultaneous removal of $SO_2$ and $NO_X$. For example, stationary combustion sources found at power plants, paper mills and the like which generate large quantities of flue gas containing both $SO_2$ and $NO_X$ conventionally have scrubbers for $SO_2$ removal. Minor modifications in accordance with this invention to provide flue gas oxidation with $H_2O_2$ will enable the substantial removal of $NO_X$ as well, at a cost which is less than inherent in the use of other methods.

It should be noted that injection apparatus useful with this invention may also comprise a pre-vaporization apparatus such as is commercially available.

Many modifications and other embodiments of the invention will come to the mind of one skilled in the art having the benefit of the teachings presented in the foregoing descriptions and the associated drawings. Therefore, it is to be understood that the invention is not limited to the specific embodiments disclosed, and that the modifications and embodiments are intended to be included within the scope of the depending claims.

That which is claimed is:

1. A method for removing nitrogen oxiodes ($NO_X$) from gas stream from a stationary source, the method comprising:
   injecting an oxidizing stream of hydrogen peroxide ($H_2O_2$) into the flue gas stream under gas-phas reaction condition at wich nitric oxide (NO) is oxidized to nitrogen dioxide ($NO_2$) and further oxidized to water-soluble nitrogen oxyacid $HNO_3$; and
   removing the notrogen dioxide ($NO_2$) and water-soluble nitrogen oxyacid $HNO_3$ from gas stream.

2. A method according to claim 1 wherein the gas-phase reaction conditions include a reaction temperature elevated above ambient, the gas stream being unsaturated with respect to water, and the hydrogen peroxide being injected as a water solution which evaporates upon contact with the gas stream.

3. A method according to claim 2 wherein a concentration of hydrogen peroxide in the water solution is less than about 70 percent by weight.

4. A method according to claim 1 wherein the hydrogen peroxide is injected as an atomized stream.

5. A method according to claim 1 wherein the hydrogen peroxide is injected as a pre-vaporized stream.

6. A method according to claim 1, further comprising:
   maintaining the temperature of the hydrogen peroxide at a temperature so that the hydrogen peroxide does not decompose prior to injecting the hydrogen peroxide into the flue gas stream.

7. A method according to claim 1, wherein injecting the oxidizing stream of hydrogen peroxide into the flue gas stream includes placing the oxidizing stream near the center of the flue gas stream.

8. A method according to claim 1, wherein injecting the oxidizing stream of hydrogen peroxide into the flue gas stream includes having the velocity of the hydrogen peroxide stream sufficient to achieve rapid intimate mixing with the flue gas stream.

9. A method according to claim 1, wherein the flue gas stream is located in a flue gas pipe and the hydrogen peroxide stream is injected so as to minimize the interaction of the hydrogen peroxide with the interior of the flue gas pipe.

10. A method according to claim 1 wherein the gas-phase reaction conditions comprise a flue gas stream temperature of between about 20° C. and about 650° C.

11. A method according to claim 1 wherein the gas-phase reaction conditions comprise a flue gas stream temperature of about 300° C. to about 600° C.

12. A method according to claim 1 wherein the gas-phase reaction conditions comprise a residence time of at least about 0.1 seconds.

13. A method according to claim 1 wherein the hydrogen peroxide is injected at a rate equal to about 0.5 to 2.0 moles per mole of nitrogen oxides ($NO_X$).

14. A method for removing nitrogen oxides ($NO_X$) from a flue gas stream from a stationary source, the method comprising:
   injecting a stream of hydrogen peroxide into the flue gas to form gas-phase hydroxyl radicals;
   contacting the hydroxyl radicals with the flue gas to oxidize at least a substantial portion of the nitric oxide to nitrogen dioxide and further oxidize to water-soluble nitrogen oxyacid $HNO_3$;
   scrubbing the oxidized flue gas with an alkaline aqueous stream to absorb the water-soluble nitrogen oxyacid $HNO_3$ thereinto; and
   separating the alkaline aqueous stream containing water-soluble nitrogen oxyacid $HNO_3$ from the flue gas.

15. A method according to claim 14, wherein contact of hydroxyl radicals with the effluent flue gas is maintained for a period of at least 0.1 seconds at a temperature of about 400° C. to about 650° C.

\* \* \* \* \*